United States Patent [19]

Hall

[11] 4,169,543

[45] Oct. 2, 1979

[54] AMPLITUDE RESPONSIVE DETECTOR

[75] Inventor: David L. Hall, Houston, Tex.

[73] Assignee: Keystone International, Inc., Houston, Tex.

[21] Appl. No.: 844,040

[22] Filed: Oct. 20, 1977

[51] Int. Cl.² .............................................. B67D 5/08
[52] U.S. Cl. ....................................... 222/56; 222/64; 73/304 C; 340/612
[58] Field of Search .................... 222/1, 52, 56, 63, 64, 222/65; 73/290 R, 304 C; 340/612, 617

[56] References Cited

U.S. PATENT DOCUMENTS

| | | | |
|---|---|---|---|
| 3,653,543 | 4/1972 | Preikschat | 222/64 X |
| 3,862,571 | 1/1975 | Vogel | 73/304 C |
| 3,879,644 | 4/1975 | Maltby | 73/304 C X |
| 3,935,970 | 2/1976 | Spaw | 222/56 |

*Primary Examiner*—Joseph J. Rolla
*Attorney, Agent, or Firm*—Browning, Bushman & Zamecki

[57] ABSTRACT

Disclosed are apparatus and method for detecting the presence, or absence, of material at a predetermined location. A crystal controlled oscillator generates a constant-frequency, constant-amplitude signal which is fed through a load resistor to an antenna sensor circuit, including an antenna probe positioned at the sensing location. The amplitude of the signal fed to the sensor circuit varies as the impedence of the antenna probe is affected by material in its environment, or the lack thereof. The signal amplitude is converted to a d-c voltage level, which is added to a reference d-c voltage level preset with the antenna probe free of impedance-affecting material. The difference voltage level value thus obtained, and which reflects the environment of the antenna probe, is used to control a switching circuit whose output assumes one value or another, depending ultimately on the antenna probe's environment. The output from the switching circuit may be used to operate one or more devices indicating the environment of the antenna probe, and/or affecting the environment by adding to, and/or removing therefrom, material affecting the impedance of the antenna probe.

54 Claims, 4 Drawing Figures

AMPLITUDE RESPONSIVE DETECTOR

BACKGROUND OF THE INVENTION

1. Field of the Invention

The present invention pertains to apparatus and methods for detecting the presence or absence of material at a predetermined location. More particularly, the present invention relates to systems for determining the amount of material accumulated at a locale. Apparatus and methods of the present invention find particulr application in the case of material containers, such as bins, wherein the amount of material present may be determined by detecting the level of material. Appropriate indicators, or warning devices, may be triggered ultimately by use of the present invention, and systems for adding material, or removing material, may also be operated in response to detection of the material level by use of the present invention.

2. Description of the Prior Art

Several prior art systems available for measuring material level in bins include the use of mechanical probes which extend into the bin. Such a probe is made to vibrate, and the physical characteristics of the elastic disturbances, which are affected by the quantity of material present about the probe, are analyzed in terms of the quantity of material present.

Other prior art designs rely upon the variation of one or more electrical properties due to the presence of material at different levels within the bin. Thus, capacitive reactance of one or more probes may be affected to signal the amount of material present. The operation of an oscillator circuit, including a resonant probe, may be affected to operate a control system in response to the presence of material near the resonant probe.

U.S. Pat. Nos. 3,807,231 and 3,935,970 disclose a measuring system, and related control system, wherein the reactance of an antenna probe varies as a function of the level of material in the container adjacent the antenna. The antenna reactance varies the frequency of a transmitter signal, which is then combined with a constant frequency reference signal. The frequency of the resulting difference signal is then used to operate a material level indicator, and to provide control information for operating automatic systems for controlling the material level.

SUMMARY OF THE INVENTION

The apparatus of the present invention include an antenna probe which is part of a tuned antenna sensor circuit. The antenna sensor circuit combines with a load resistor to form an impedance bridge on which is impressed a constant-frequency, constant-amplitude signal generated by a crystal controlled oscillator. The antenna probe is positioned at a location at which the presence or absence of material is to be detected. Thus, the antenna probe may be located at a predetermined level within a bin, or other material container.

When material has come close enough to the antenna probe, the latter's load impedance is affected due to the change in permativity and permeability of the environment. As a result of the consequent drop in antenna probe impedance, the amplitude of the signal impressed on the impedance bridge decreases between the load resistor and the antenna sensor circuit.

The signal across the impedance bridge, whose amplitude is thus a reflection of the presence or absence of material about the antenna probe, is rectified and integrated by a converter circuit to produce a d-c voltage level whose value is also dependent on the presence or absence of material about the antenna probe. The voltage level from the converter circuit is combined with a preset voltage reference level at a summing node. The combined signal from the summing node, also in the form of a d-c voltage level, is fed to the comparator of a switching circuit where it is compared to a reference level. The output of the switching circuit is dependent on whether the summing node voltage level is less than the comparator reference level. Thus, the presence or absence of material about the antenna probe determines the relative value of the summing node voltage level compared to the comparator reference level of the switching circuit and, therefore, the output of the switching circuit. The switching circuit output level may, in turn, be used to operate a control unit, or other system, whereby indicator or warning devices may be triggered in response to the presence or absence of material about the antenna probe. Also, systems designed to add material to the bin, or other container, in which the antenna probe is located, may be operated based on the output from the switching circuit, as well as may systems designed to remove material from the container.

The switching circuit comparator is equipped with a positive feedback loop which changes the comparator reference level each time the switching circuit output is altered. As a result, after one such change in switching circuit output level, due to the summing node voltage level exceeding or falling below that of the comparator reference level, the summing node voltage level must change through a predetermined voltage range to effect another variation in the switching circuit output. Consequently, the impedance of the antenna probe must change through an impedance range to alter the switching circuit output. The purpose of this hysteresis effect in the switching circuit is to prevent unwanted variations in the switching circuit output signal due to such causes as noise, or minute changes in antenna probe impedance that might occur while the summing node voltage level value is close to that of the comparator reference level. Thus, a false reading of the presence or absence of material about the antenna probe, due to such extraneous causes, may be avoided.

The voltage reference level summed with the output voltage level from the convertor circuit is obtained by a set point circuit which rectifies the negative side of the signal from the crystal controlled oscillator before that signal is loaded on the impedence bridge. The oscillator output signal is first attenuated by a voltage divider selectively adjusted so that the set point circuit produces a rectified, integrated d-c voltage level at the summing node that combines with the converter output voltage level to produce a predetermined level when the environment of the antenna probe is free from impedance-affecting material. To adjust the voltage reference level from the set point circuit, the combined summing node voltage level, with the antenna probe free as described hereinbefore, is fed to a calibration circuit wherein the combined voltage level is compared to a predetermined voltage set point level in a comparator. The output of the comparator controls the power to a display device, such as a light emitting diode, so that the voltage divider of the set point circuit may be selectively adjusted to a position wherein the display device indicates the summing node voltage level is that of the set point level within the calibration circuit. The purpose of the set point circuit and its output voltage reference level is to provide a reference level based upon the amplitude of the oscillator output signal, as unaffected by material surrounding the antenna probe, with which the d-c voltage level from the converter, varying with the amplitude of the oscillator signal in response to impedance variations of the antenna probe due to materials surrounding the antenna probe, may be compared. The difference signal obtained at the summing node, is then used to operate the switching circuit.

In the method of the present invention, an antenna probe is provided at a location where the presence or absence of material is to be detected. The antenna probe forms a portion of an impedance bridge, which is loaded with a constant-frequency, constant-amplitude oscillatory signal. The amplitude of the signal is then made to vary depending on the variation in the load impedance of the antenna probe due to the presence or absence of material surrounding the antenna probe. The varying oscillatory signal is then rectified and integrated to provide a d-c voltage level reflecting the impedance changes of the antenna probe. This voltage level is added to a voltage reference level obtained from the oscillatory signal with no impedance affecting materials surrounding the antenna probe. The reference level is in the form of a negative d-c voltage which is then added to the voltage level reflecting the antenna probe impedance changes. The resulting difference signal is compared to a comparator reference voltage, and, depending on the comparison, an output voltage level is made to take on one or another value. Thus, an output signal is generated whose value depends on whether the antenna probe is adjacent material which affects its load impedance.

The output signal generated in response to the presence or absence of material about the antenna probe, according to the present invention, may be used to control a variety of ancillary devices. Thus, for example, indicator and display devices may be used to show the presence or absence of material at the level of the antenna probe. Also, warning devices may be triggered by the output signal. Systems designed to add material to the container in which the antenna probe is positioned may also be turned on or turned off according to the value of the output signal from the detector of the present invention. Similarly, systems designed to remove material from such a container may be controlled according to the output signal from the detector.

The antenna probe of the present invention may be of any conventional design, and may be constructed to be sufficiently durable to withstand the impact of heavy and/or abrasive materials whose presence, or absence, is to be detected. Similarly, the entire detector may be fabricated relatively compactly.

It will be appreciated that the detector of the present invention provides a relatively stable and reliable oscillatory signal for loading the antenna probe. The switching circuit hysteresis effect further ensures a degree of stability in the output signal from the detector to highten the fidelity of the detector output signal as reflecting the presence or absence of material at the location of the probe. The set point circuit also provides a reference level, which may be determined after the antenna probe is positioned within the container in which it is to function, and with which the d-c voltage level, dependent on the impedance of the antenna probe, may be combined.

It will be appreciated that the methods and apparatus of the present invention may be employed in a variety of situations, and to detect the presence or absence of a variety of materials. Also, more than one such detector of the present invention may be utilized in a given application as noted hereinafter.

DESCRIPTION OF PREFERRED EMBODIMENTS

Figure 1:
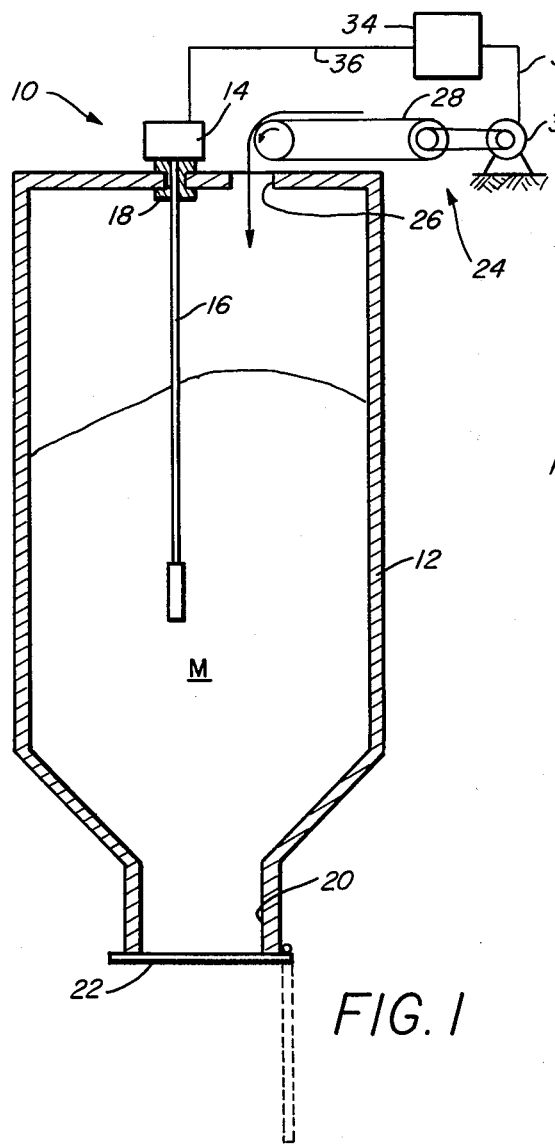
FIG. 1 is a vertical cross-sectional view illustrating a material container equipped with the detector of the present invention connected to a material feed mechanism.

In FIG. 1, the detector of the present invention, shown generally at 10, is mounted at the top of a bin, or material container, 12 containing a quantity of material M. The detector 10 includes a unit 14 containing electrical circuitry, an antenna probe 16 extending downwardly within the bin 12, and a connector 18 by which the detector 10 is mounted on the bin while the antenna probe is insulated from the bin walls. The bin 12 is of conventional construction, having a dispensing opening 20 at its lower end which is covered by a hinged door 22. When the door 22 is moved into the dotted line position, material within the bin 12 flows by gravity from the opening 20.

A material feed system, shown generally as 24, is located at the top of the bin 12 to introduce material into the bin through the opening 26. The feed system 24 is shown schematically to include a conveyor belt 28 operated by a motor 30, which in turn is joined by an appropriate connector 32 to a control unit 34. Control unit 34 is connected by an appropriate connector 36 to the electrical circuitry within the detector 10. Thus, as will be more fully explained hereinafter, the detector at 10 may operate on the control unit 34 in response to the detector sensing material at a certain level within the bin, whereby the control unit may, for example, cause the feed system at 24 to cease adding material to the bin.

Figure 2:
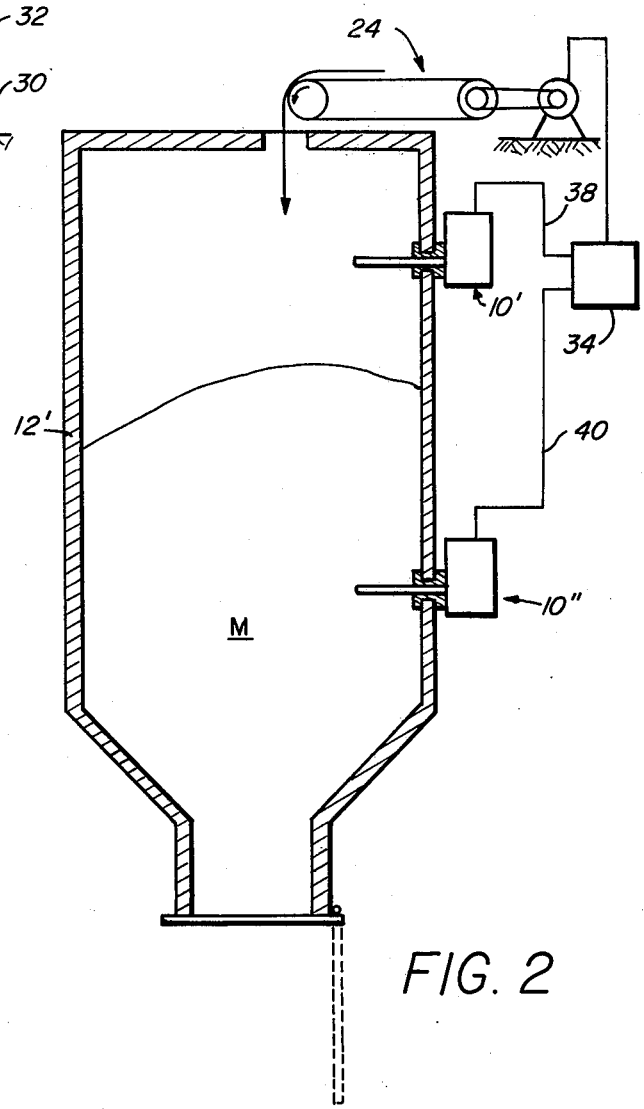
FIG. 2 is a view similar to FIG. 1, showing use of the detector in different positions.

In FIG. 2, a bin 12' is equipped with a detector 10' positioned along one side of the bin. The material feed system at 24 is again operable by way of the control unit 34, which is connected to the detector 10' by an appropriate connector 38. A second detector 10" is positioned along the side of the bin 12' at a lower level than that of the detector 10', and is connected to the control unit 34 by an appropriate connector 40. In this application, the lower level detector 10" may function, through the control unit 34, to initiate the addition of material to the bin 12', while the upper level detector 10' may cause the cessation of such material addition.

Figure 3:
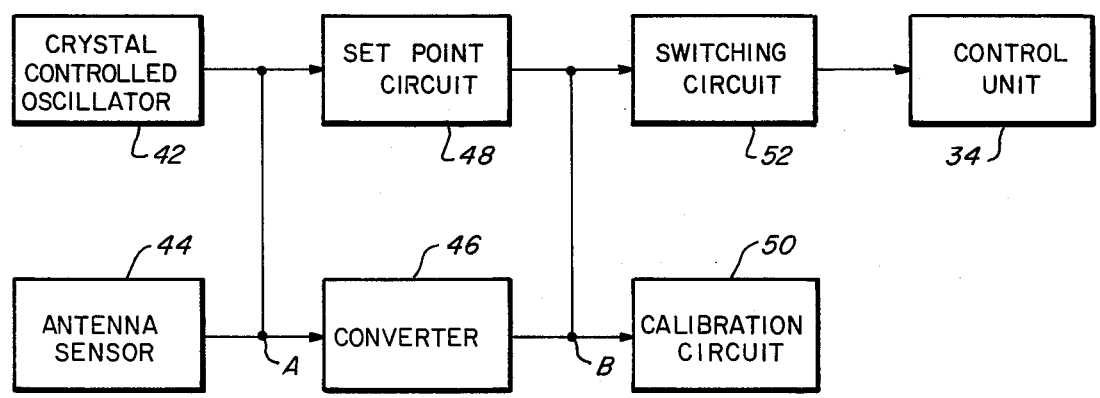
FIG. 3 is a block diagram indicating features of the present invention.

The electrical circuitry of the level detector of the present invention is indicated generally in FIG. 3. A crystal controlled oscillator 42 provides a constant-frequency, constant-amplitude signal. An antenna sensor 44, which includes the antenna probe 16 of FIG. 1, is loaded with the signal from the oscillator 42. The impedance of the sensor circuit 44 is dependent on whether the antenna probe 16 is immersed in material, such as M of FIGS. 1 and 2. Generally, as material builds up about the antenna probe 16, the impedance load of the antenna sensor 44 decreases, and the amplitude of the signal at the point A decreases. The signal from A is transformed by a converter 46 into a d-c voltage level dependent on the amplitude of the signal at A. A set point circuit 48 provides a reference signal added to the output of the converter 46 at the point B. The reference voltage level is determined by the set point circuit 48 with the use of a calibration circuit 50 under conditions in which the antenna 16 is free from any surrounding material. The signal at B operates to move a switching circuit 52 between one configuration and another. The configuration of the switching circuit 52 determines the output to the control unit 34. While the control unit 34 is shown in FIGS 1 and 2 as an element external to the unit 14 of the detectors 10, 10' and 10", the control unit may be included therein as an integral part of the electronic circuitry of the detector.

Figure 4:
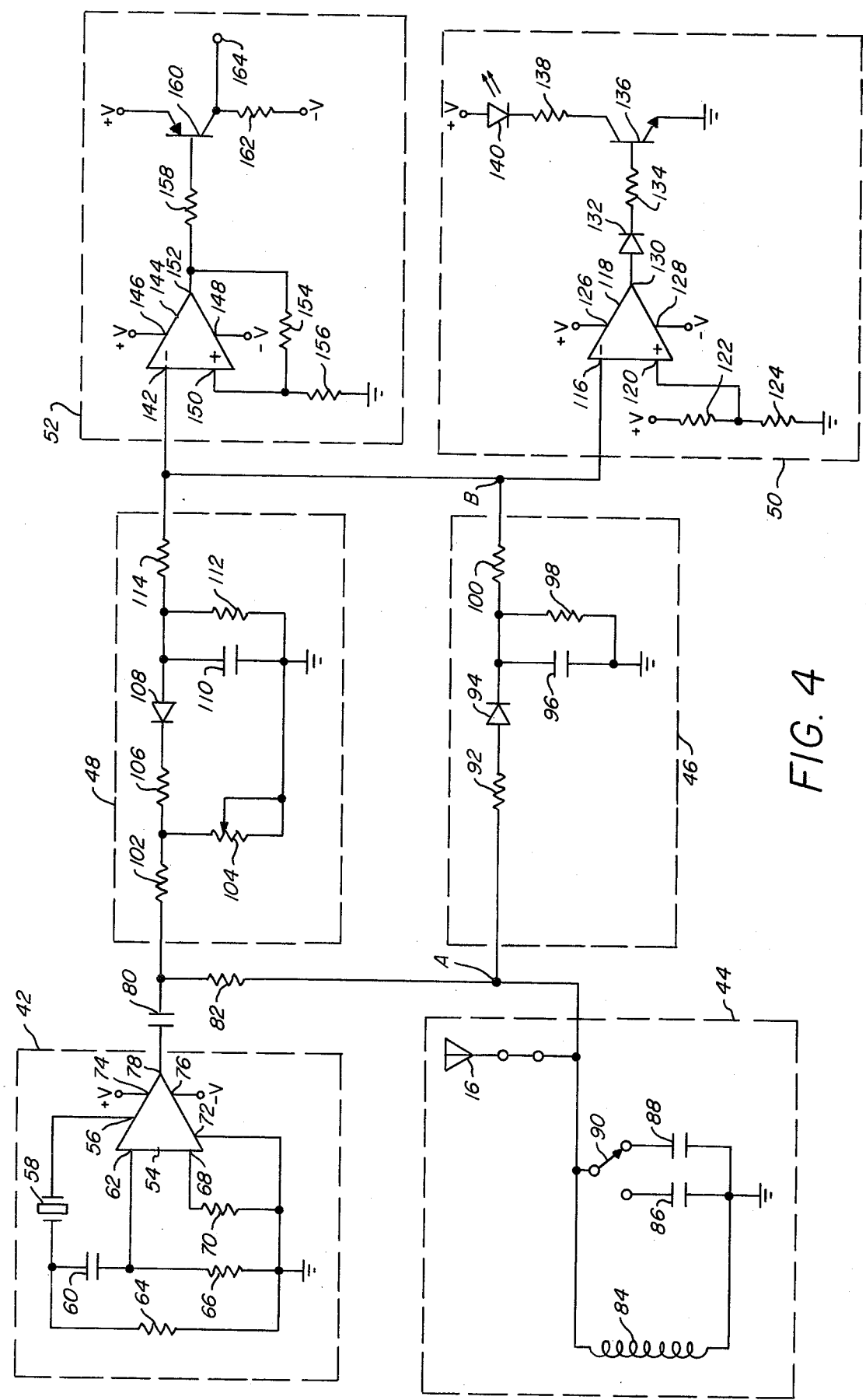
FIG. 4 is a schematic diagram of the electrical circuity employed in the preferred form of the present invention.

The elements 42–52 shown in FIG. 3 are generally indicated as including the components within dashed line boxes in FIG. 4. In the crystal controlled oscillator 42, a differential amplifier 54 forms an output signal at output 56, which is then impressed on a crystal 58. The signal from the crystal 58 is fed through a capacitor 60 to the positive, or non-inverting, input 62 of the amplifier 54. Resistors 64 and 66, leading to ground, combine with the capacitor 60 to smooth the input at 62 to the amplifier. The negative, or inverting, input 68 of the amplifier 54 is grounded through a resistor 70. The amplifier 52 is also grounded through the control terminal 72. +V and −V voltages are applied at power inputs 74 and 76, respectively. An appropriate power spply of conventional design may be used to provide these voltages ±V, as well as the power requirements of the other elements of the detector circuitry. Such power supplies are well known in the field, and will not be discussed in detail herein.

A constant-frequency, constant-amplitude wave is produced at the amplifier output 78 to be fed through a coupling capacitor 80. The wave emerging from the capacitor 80 may be of any shape, but, as an example, a square wave will be considered herein. The square wave is loaded across a resistor 82 to the point A. The resistor 82 combines with the antenna sensor 44 to constitute an impedance bridge. Due to the relatively high frequency of the square wave (typically, a 1 MHz crystal is used at 58), this impedance bridge is primarily capacitive in nature. At the point A, the square wave has become a generally saw-tooth wave due to the resistor 82 and the loading of the antenna sensor 44. The shape and amplitude of the saw-tooth wave at A is then determined by the impedance load on the antenna probe 16 of the sensor circuit 44.

An L-C tuned circuit is interposed between the antenna probe 16 and ground in the sensor circuit 44. An inductor 84 is positioned in parallel with one of the two capacitors 86 and 88, as determined by the position of a switch 90. The particular capacitor 86 or 88 is chosen in conjunction with the selection of the antenna probe 16, which may be of different lengths. Thus, the appropriate capacitor 86 or 88 is selected so that the entire antenna sensor circuit 44, with the particular antenna probe 16 free from surrounding materials affecting its impedance, exhibits a resonant frequency close to or the same as the frequency of the output signal from the crystal controlled oscillator 42.

The saw-tooth signal at the point A is received by the converter 46 through a coupling resistor 92. A semiconductor diode 94 rectifies the signal, passing only the positive portions thereof to a filter/integrator including a capacitor 96 and a resistor 98 arranged in parallel. This filter/integrator produces a positive d-c voltage level whose value is proportional to the amplitude of the saw-tooth signal at point A. The output from the filter/integrator of the converter 46 is fed to the point B through a coupling resistor 100. Thus, as the impedance load of the antenna sensor 44 is caused to decrease due to material build-up about the antenna probe 16, the amplitude of the saw-tooth signal at A decreases, and the voltage level impressed upon the coupling resistor 100 decreases.

The point B acts as a summing node for the d-c voltage level from the converter 46 as well as a d-c voltage level produced by the set point circuit 48. The square wave output from the coupling capacitor 80 is impressed across a voltage divider in the set point circuit 48, including resistors 102 and 104. Resistor 104 is a variable resistor leading to ground. The signal, of amplitude determined, in part, by the relative values of the resistors 102 and 104, is fed through a coupling resistor 106 to a semiconductor diode 108 positioned to rectify the signal by passing only the negative values thereof. The rectified, negative signal is fed to a filter/integrator including a capacitor 110 in parallel with a resistor 12. This filter/integrator produces a negative d-c voltage level whose value reflects the amplitude of the square wave originally fed to the load resistor 82, as well as the setting of the variable resistor 104. A coupling resistor 114 passes the negative d-c voltage level from the set point circuit 48 to the summing node B.

The calibration circuit 50 is utilized in adjusting the setting of the variable resistor 104 to determine the d-c voltage level output from the set point circuit 48. With the antenna probe 16 in position, and free from surrounding, impedance-altering material, the resistor 104 is adjusted until the absolute value of the d-c voltage level output of the set point circuit 48 is a few millivolts less than the value of the d-c voltage level output of the converter 46. As an example, this difference in values may be set at 18 millivolts. Then, the net d-c voltage level at point B is 18 millivolts.

The value of the voltage level at B with a no-load condition on the antenna probe 16 may be arrived at with the use of the calibration circuit 50, as noted hereinbefore. The voltage at B is fed to the negative, or inverting, input 116 of an operational amplifier 118 used as a comparator. The positive, or inverting, input 120 is fed from a tap in a voltage divider including resistors 122 and 124 extending between ground and a +V power level. This voltage divider arrangement is chosen to provide a set point voltage level at the input 120 that is equal to the desired summing voltage level at B. Thus, in this example, the set point level at the input 120 is set at 18 millivolts. The comparator 118 is provided with power levels of +V and −V at power terminals 126 and 128, respectively. The voltage level at the output terminal 130 of the comparator 118 is normally −V, unless the voltage level at the input 116 is less supplied that at the input 120, here, 18 millivolts. In the latter case, the output at terminal 130 is +V. A +V output from the comparator 118 will be passed by a semiconductor diode 132 and a coupling resistor 134 to the base of a transistor 136 of the n-p-n type. A −V output at the terminal 30 will be blocked by the diode 32. The emitter of the transistor 136 is grounded, while the collector is joined, through a resistor 138, to a light-emitting-diode (LED) 140. The other side of the LED 140 is spplied with +V volts.

Until the voltage level at the input 116 falls below that at the input 120, the output from the comparator 118 has a value of −V ovolts, and no current can flow through the transistor 136 to light the LED 140. As soon as the Voltage level at the input 116 falls below that at the input 120, here, 18 millivolts, the output of the comparator 118 switches to +V volts, which is passed by the diode 132 to provide a positive voltage value on the base of the transistor 136. Then, with the current flowing through the transistor 136 and resistor 138, the LED 140 is lighted. Thus, by adjusting the variable resistor 104 until the LED 140 just lights, the summing voltage level at the point B may be determined at the desired value, here, 18 millivolts.

With the summing voltage level at B adjusted as described hereinbefore, the detector may be utilized to provide appropriate output values from the switching circuit 52. The voltage level at B is fed to the negative, or inverting, input 142 of another operational amplifier 144 used as comparator. Power levels +V and −V are provided at power terminals 146 and 148, respectively. Thus, the value provided by the comparator 144 at its output terminal 152 is −V as long as the voltage level at the input 142 does not fall below that at the positive, or non-inverting, input 150. If the voltage value at the input 142 falls below that at the input 150, the voltage level output at the terminal 152 becomes +V.

To provide a hysteresis effect, the comparator 144 is equipped with a positive feedback from the output terminal 152 to the reference input 150. Resistors 154 and 156 provide a voltage divider between the output terminal 152 and ground. The reference level for the input 150 is obtained from a tap on this voltage divider to provide an absolute value for the reference level at the input 150 of a few millivolts. As an example, this reference level may set at 3 millivolts. Then, as the output level at the terminal 152 is made to vary between +V and −V, the reference level at the input 150 also varies ±3 millivolts. The effect is to require the voltage level at the point B, which is fed to the input 142 of the comparator 144, to vary by at least 6 millivolts to cause the output of the comparator 144 to change, once the variation in the voltage level at B has initially affected the comparator 144 to change its output. Thus, relatively negligible changes in the voltage level at B, due to possible noise or other interference, for example, acting on the antenna probe 16, will not cause unwanted fluctuations in the output of the comparator 144.

The signal from the output terminal 152 is fed through a resistor 158 to the base of a second transistor 160. This transistor 160 is of the p-n-p type, with its emitter joined to a +V power source. The collector of the transistor 160 is connected, through a resistor 62, to a −V power source. The output from the switching circuit 52 is also obtained from the collector of the transistor 160.

With the output from the comparator 144 at −V volts, current flows from the +V power source through the emitter to the base of the transistor. In this configuration, with a negative signal on the base of the transistor 160, current flows through the resistor 162, and the output signal at the terminal 164 is +V. When the output from the comparator 144 goes to +V volts, the positive signal on the base of the transistor 160 cuts off the flow of current through the emitter, and no current flows through the resistor 162. Then, the output signal from the switching circuit 52, provided on the terminal 164, becomes −V.

The output signal from the terminal 164 may be used as the input signal to the control unit 34 of FIGS. 1–3. There, the input signal may be used to operate one or more relays, for example, to control the operation of the material feed system at 24 in FIGS. 1 and 2, and/or to operate one or more warning or indicator devices to convey information as to the level of material within the bin 12 or 12'. Such control and display devices, which may be chosen appropriate to the application of the detector of the present invention, are well known in the art and are not described in detail herein.

The detector of the present invention may be positioned in any location as desired to detect the presence or absence of material which may affect the impedance load on the antenna probe 16. Such chanes occur due to the presence or absence of such material affecting the permativity and permeability of the spatial area into which the electromagnetic fields induced by the antenna probe signal are radiated. With he detector in place, and with no such material surrounding the antenna probe 16, the summing voltage level at point B is fixed as described hereinbefore. Thus, the variable resistor 104 is adjusted until the LED 140 is just turned on. At that point, the voltage level at the input 16 of the comparator 118 is just equal to the desired set point voltage level at input 120. With this adjustment of resistor 104 made, the detector is ready for use.

The suggested positions for use of the detector as indicated in FIGS. 1 and 2 are provided by way of example only. The detector of the present invention may find use in virtually any orientation, and in conjunction with virtually any type of material handling system. However, by way of example rather than limitation, the installation illustrated in FIG. 1 is considered. With no material in the bin 12, or with the material level below that of the bottom of the antenna probe 16, the signal at the point A is unaffected by any external loading of antenna sensor 44. Consequently, the voltage level at point B equals the set point voltage level previously determined. Therefore, the output from the comparator 144 is −V volts and the voltage at the output terminal 164 is +V. As material tends to fill the bin 12, the antenna probe 6 becomes at least partially surrounded by the material. As the impedance load of the antenna probe 16 and, therefore, the antenna sensor 44, decreases due to the material now around the antenna probe, the amplitude of the signal at A decreases accordingly. As a result, the output voltage level from the converter 46 decreases, and the voltage level at point B drops so that the voltage level at the input 142 becomes less than that at the input 150. The output from the comparator 144 at the terminal 152 becomes +V volts, and the positive voltage value on the base of the transistor 160 causes the voltage value at the output terminal 164 to become −V voltage as well. At this point, the feedback circuit to the reference input terminal 150 of the comparator 144 causes the reference level to be raised from, say −3 millivolts to +3 millivolts. With the change in voltage value at the output terminal 164, the input signal to the control unit changes, thereby causing, in the case illustrated in FIG. 1, the conveyer belt 28 to stop.

As material is removed from the bin 12, the antenna probe 16 becomes clear of the material, and the load impedance of the antenna sensor 44 returns to its original value, representing the antenna probe 16 being free of surrounding impedance-affecting material. When that occurs, the amplitude of the signal at point A increases, causing the voltage level output from the converter 46 to rise. As the voltage level at the point B increases, the input to the comparator 144 at the terminal 142 rises. When the value of the input at the terminal 142 becomes greater than 3 millivolts, the output signal at the terminal 152 returns to $-V$ volts, thereby placing a negative voltage on the base of the transistor 160 and changing the voltage level at the output terminal 164 to $+V$. Also, the feedback to the reference input 150 causes the value at that input to go from 3 millivolts back to $-3$ millivolts. Thus, to change the value at the output terminal 164 again, the voltage level at the point B must become more negative than $-3$ millivolts.

The purpose of the feedback loop to the reference level 150 of the comparator 144 is to provide a stable performance of the level detector in the presence of noise or other extraneous effects which might cause the impedance load on the antenna probe 16 to undergo minor fluctuations. Such extraneous variations in the impedance load on the antenna proble 16 might also occur as material is poured into the bin 12 adjacent the antenna probe 16.

In the method of the present invention, a constant-frequency, constant-amplitude signal is generated by the crystal controlled oscillator 42, and fed through a load resistor 82 to an antenna sensor circuit 44. The antenna sensor 44 is tuned so that its resonant frequency is very nearly the same as the frequency of the signal generated by the crystal controlled oscillator 42; an impedance bridge is formed by the combination of the load resistor 82 and the antenna sensor 44. The impedance of the antenna sensor 44 varies depending on the environment of the antenna probe 16. Thus, the impedance of the antenna probe 16, as well as that of the antenna sensor 44, takes on different values depending on the material, if any, adjacent the antenna probe which changes the permeability and permativity of the antenna probe environment. Consequently, the amplitude of the signal at point A, the "center tap" of the impedance bridge, varies depending on the change in impedance of the antenna probe 16.

The signal from point A is converted to a positive d-c voltage level by the converter 46. This d-c voltage level varies in value as the amplitude of the signal at the point A varies depending on the impedance of the antenna probe 16.

A second, reference d-c voltage level is generated by the set point circuit 48. The set point circuit 48 receives the signal generated by the crystal controlled oscillator 42. A voltage divider within the set point circuit 48 is used to selectively attenuate the amplitude of the signal from the oscillator 42. The attenuated signal is then converted to a negative d-c voltage level which is provided by the set point circuit 48 to the summing node, point B, to which the output d-c voltage level from the converter 46 is fed.

The generally positive d-c voltage level from the converter 46, whose value reflects the environment of the antenna probe 16, is added to the generally negative reference voltage level from the set point circuit 48 at the summing node B. The difference in the absolute values of these two combined signals is then fed to the comparator 144 of the switching circuit 52. There, the signal from the point B is compared to a reference voltage level, and the output from the switching circuit 52 is dependent on whether the signal from the point B is less than this reference voltage level. Thus, as the amplitude of the signal at the center of the impedance bridge, A, is made to vary depending on the environment of the antenna probe 16 and the resultant voltage level at the summing node B reflects this amplitude variation, the output of the switching circuit 52 is made to take on one value or another depending on the environment of the antenna probe.

The voltage reference level from the set point circuit 48 may be determined with the use of the calibrating circuit 50, and with the environment adjacent the antenna probe 16 free of any impedance-affecting materials. Then, the voltage level at the summing node B is fed to a comparator 118 in the calibration circuit to be compared to a predetermined set point voltage level. The voltage divider of the set point circuit 48 is then adjusted until the voltage level at the summing node B is just at the predetermined set point level of the calibration circuit 50.

A positive feedback loop from the output of the comparator 144 to its reference input provides a hysteresis effect to require the summing node B voltage level value to swing through a voltage gap before returning the value of the output signal from the switching circuit to its prior value. Thus, extraneous fluctuations in the impedance of the antenna probe 16, not reflective of the environmental changes intended to be detected according to the method of the present invention, will not affect the output signal of the switching circuit 52.

The output of the switching circuit 52 may be fed to a control unit, such as 34 described herein, for the purpose of operating one or more devices to reflect the environment of the antenna probe 16. Also, apparatus for changing that environment, such as systems for removing the material from the vicinity of the antenna probe 16, and/or for adding material thereto, may be operated through such a control unit 34. In the particular embodiment illustrated in FIGS. 1 and 2, the output from the switching circuit 52 may ultimately effect the addition of material to the container in which the antenna probe 16 is positioned, and/or control the removal of such material therefrom.

In the case of the arrangement shown in FIG. 2, the output from the terminal 164 of the switching circuit 52 of the lower detector 10" may be used to cause the control unit 34 to initiate the addition of material to the bin 12' by the material feed system 24. Thus, when the level of material in the bin 12' falls below the level of detector 10", the rise in the voltage level at point B therein, and the accompanying rise in voltage at the output terminal 164, may be used to operate a relay in the control unit 34 to turn on the feed system 24. If the material in the bin then rises in level beyond that of the level detector 10", the change in the output value at the terminal 164 of the lower level detector 10" may simply not be used to stop the operation of the feed system 24. Such a cessation of operation by the feed system 24 may be effected, for example, by the material in the bin' reaching the level of the detector 10', thereby causing a drop in the voltage level at the point B therein, and a resulting decrease in voltage at the terminal 164 of the switching circuit 52 of the level detector 10'. In that case, the control unit 34 may then be caused to stop further operation of the feed system 24. Similarly, as the level of the material in the bin 12' falls below that of the upper level detector 10', the change in output from that particular detector may also not be used for initiating the operation of the feed system 24. The resumption of addition of feed material into the bin 12' may be caused by the level of material in the bin 12' falling below that of the lower detector 10''.

The particular application of the level detector of the present invention, and the desired operations it is to control, will determine how the output signal from the switching circuit 52 is utilized, and will also, therefore, dictate the nature of the control unit 34, or control units, which may be employed. The switching circuit 52 may also be designed by replacing the positive feedback loop with a negative feedback loop to the input 142, thereby providing an analog output signal at terminal 152 for use in operating ancillary devices.

The antenna probe 16 may be of a variety of designs. A metal rod, or a metal cable appropriately extended, may be used as an antenna probe. The nature of the application may also render one or another antenna designs more desirable.

It will be appreciated that the level detector of the present invention may be used to detect the presence or absence of a variety of materials, since virtually any material will have an effect on the impedance load of the antenna sensor 44. The primary difference in use of the detector with different materials is that materials which have a lesser effect on the impedance load of the sensor 44 will be required to surround the antenna probe 16 to a greater extent to change the output of the comparator 144 for a given level detector than will the materials having greater effects on the antenna load impedance. Thus, the advantage of being able to position the load detector of the present invention in a position shown in FIG. 2, wherein virtually all of the antenna probe 16 is affected by the presence of material near any portion of the antenna probe, will be apparent.

The foregoing disclosure and description of the invention is illustrative and explanatory thereof, and various changes in the method steps as well as in the details of the illustrated apparatus may be made within the scope of the appended claims without departing from the spirit of the invention.

I claim:

1. Apparatus for detecting the presence or absence of material at a location comprising:
   (a) signal generation means for providing an oscillatory signal;
   (b) sensor means, including antenna probe means for positioning at said location, and for receiving said oscillatory signal;
   (c) converter means for producing a voltage level whose value is dependent on the amplitude of said oscillatory signal so received by said sensor means;
   (d) set point circuit means for producing a voltage reference level to which said voltage level produced by said converter means is added; and
   (e) switching means, operable by the voltage sum of said voltage reference level and said voltage level, for providing an output signal dependent on the presence or absence of material at said location.

2. Apparatus as defined in claim 1 wherein said oscillatory signal is so provided by said signal generation means as a constant-frequency, constant-amplitude signal.

3. Apparatus as defined in claim 1 wherein said signal generation means comprises crystal controlled oscillator means.

4. Apparatus of claim 1 wherein said sensor means further comprises tuned circuit means for selectively varying the resonant frequency of said sensor means.

5. Apparatus of claim 1 further comprising calibration means for comparing said voltage sum to a set point voltage whereby said voltage reference level so produced by said set point circuit means may be selectively adjusted.

6. Apparatus of claim 1 further comprising control unit means for receiving said output signal so produced by said switching means, and for controlling ancillary apparatus in response to said switching means output signal.

7. Apparatus as defined in claim 1 wherein said output signal is digital.

8. Apparatus as defined in claim 1 wherein said output signal is analog.

9. Apparatus as defined in claim 1 wherein said switching means comprises comparator means whose output controls said output signal depending on the value of said sum of said voltage level and said voltage reference level compared to a reference voltage.

10. Apparatus of claim 9 wherein said comparator means includes feedback means whereby said reference voltage takes on one of two values, depending on the value of said comparator output, to define a voltage value range through which said voltage sum must vary to cause said switching means output to vary.

11. Apparatus as defined in claim 1 further comprising an impedance bridge, including said sensor means, for providing the input to said converter means that is dependent in amplitude on the impedance of said antenna probe.

12. Apparatus of claim 11 further comprising calibration means for comparing said voltage sum to a set point voltage whereby said voltage reference level so produced by said set point circuit means may be selectively adjusted.

13. Apparatus of claim 11 further comprising control unit means for receiving said output signal so produced by said switching means, and for controlling ancillary apparatus in response to said switching means output signal.

14. Apparatus as defined in claim 11 wherein said switching means comprises comparator means whose output controls said output signal depending on the value of said sum of said voltage level and said voltage reference level compared to a reference voltage.

15. Aparatus of claim 14 wherein said comparator means includes feedback means whereby said reference voltage takes on one of two values, depending on the value of said comparator output, to define a voltage value range through which said voltage sum must vary to cause said switching means output to vary.

16. Apparatus as defined in claim 14 wherein said oscillatory signal is so provided by said signal generation means as a constant-frequency, constant-amplitude signal.

17. Apparatus as defined in claim 16 wherein said signal generation means comprises crystal controlled oscillator means.

18. Apparatus of claim 17 wherein said sensor means further comprises tuned circuit means for selectively varying the resonant frequency of said sensor means.

19. Apparatus of claim 18 further comprising calibration means for comparing said voltage sum to a set point voltage whereby said voltage reference level so produced by said set point circuit means may be selectively adjusted.

20. Apparatus of claim 8 wherein said comparator means includes feedback means whereby said reference voltage takes on one of two values, depending on the value of said comparator output, to define a voltage value range through which said voltage sum must vary to cause said switching means output to vary.

21. Apparatus of claim 20 further comprising calibration means for comparing said voltage sum to a set point voltage whereby said voltage reference level so produced by said set point circuit means may be selectively adjusted.

22. Apparatus of claim 21 further comprising control unit means for receiving said output signal so produced by said switching means, and for controlling ancillary apparatus in response to said switching means output signal.

23. A system for monitoring the level of material in a container comprising:
 (a) sensor circuit means, including an antenna probe for positioning within said container;
 (b) signal generation means for generating a constant amplitude oscillatory signal for loading said sensor circuit means;
 (c) set point circuit means for providing a selectively adjustable voltage reference level;
 (d) converter means for receiving said oscillatory signal so loaded on said sensor circuit means, and for producing a voltage level dependent on the amplitude of said oscillatory signal so received;
 (e) switching means for receiving the sum of said voltage reference level and said voltage level so produced by said converter means, and providing an output signal dependent on said voltage sum; and
 (f) calibration means for comparing said voltage sum to a predetermined set point level when said level of material in said container is below that of said antenna probe means to so selectively adjust said voltage reference level.

24. A system as defined in claim 23 wherein said signal generation means comprises crystal controlled oscillator means.

25. A system as defined in claim 23 further comprising control unit means for receiving said switching means output signal, and for controlling ancillary apparatus in response thereto.

26. A system as defined in claim 23 further comprising resistance means in series with said sensor circuit means, thereby forming impedance bridge means on which said oscillatory signal is impressed, and werein said oscillatory signal is fed to said converter means from said impedance bridge means.

27. A system as defined in claim 23 wherein said output signal is digital.

28. A system as defined in claim 23 wherein said output signal is analog.

29. A system as defined in claim 23 wherein said switching means comprises comparator means for comparing said voltage sum to a comparator reference level, wherein said comparator means includes feedback means whereby said comparator reference level takes on one of two values, depending on the value of the output of said comparator, to thereby define a voltage range through which said voltage sum must vary to cause said comparator output to vary, and whereby said comparator output value determines the value of said output signal from said switching means.

30. A system as defined in claim 29 wherein said signal generation means comprises crystal controlled oscillator means.

31. A system as defined in claim 30 further comprising control unit means for receiving said switching means output signal, and for controlling ancillary apparatus in response thereto.

32. A system as defined in claim 31 wherein said ancillary apparatus includes means for indicating the presence or absence of material at said antenna probe means.

33. A system as defined in claim 31 wherein said ancillary apparatus includes means for adding material to said container.

34. A system as defined in claim 33 wherein said ancillary apparatus includes means for removing material from said container.

35. A system as defined in claim 23 further comprising at least one additional combination of sensor circuit means, signal generation means, set point circuit means, converter means and switching means, wherein said additional antenna probe is locatable at a level different from that of said first antenna probe means.

36. A system of claim 35 further comprising control means for receiving the output signals from said switching means, and for controlling ancillary apparatus in response thereto.

37. A system as defined in claim 36 wherein said ancillary apparatus includes means for adding material to said container.

38. A system as defined in claim 36 wherein said ancillary apparatus includes means for removing material from said container.

39. A method of monitoring the presence or absence of material at a location comprising the following steps:
 (a) providing an antenna sensor circuit in the form of a tuned circuit, including an antenna probe positioned at said location and wherein said antenna sensor is a portion of an impedance bridge;
 (b) impressing an oscillatory signal on said impedance bridge;
 (c) selectively providing a voltage reference level obtained with no such material present at said location;
 (d) feeding said oscillatory signal from the center of said impedence bridge to a converter means whereby a voltage level is obtained that is dependent in value on the amplitude of said oscillatory signal as affected by the impedance of said antenna sensor circuit; and
 (e) combining said voltage level with said voltage reference level, and comparing said voltage level combination with a reference level to control the value of an output signal depending on said comparison.

40. A method as defined in claim 39 wherein said output signal is digital.

41. A method as defined in claim 39 wherein said output signal is analog.

42. A method as defined in claim 39 further comprising the additional step of providing feedback means whereby said reference level is dependent on said comparison to define a voltage range through which said voltage level combination must vary to cause said output signal to vary.

43. A method as defined in claim 42 further comprising the step of providing said oscillatory signal by way of a crystal controlled oscillator.

44. A method as defined in claim 43 further comprising carrying out the step of selectively providing said voltage reference level with the use of a calibration circuit whereby said voltage combination is compared to a predetermined set point level.

45. A method as defined in claim 44 further comprising the additional steps of:
   (a) providing control means for receiving said output signal; and
   (b) controlling ancillary apparatus by said control means in response to said output signal.

46. A method as defined in claim 45 further comprising the additional steps of employing said ancillary apparatus for adding material generally at said location.

47. A method as defined in claim 45 further comprising the additional steps of employing said ancillary apparatus for removing material generally from said location.

48. A method as defined in claim 39 further comprising the additional steps of:
   (a) providing control means for receiving said output signal; and
   (b) controlling ancillary apparatus by said control means in response to said output signal.

49. A method as defined in claim 48 further comprising the additional steps of employing said ancillary apparatus for adding material generally at said location.

50. A method as defined in claim 48 further comprising the additional steps of employing said ancillary apparatus for removing material generally from said location.

51. A method as defined in claim 39 further comprising the additional steps of carrying out the steps of Claim 38 for at least one additional antenna probe at a different location to produce at least one additional output signal.

52. A method as defined in claim 51 further comprising the additional steps of:
   (a) providing control means for receiving said output signals; and
   (b) controlling ancillary apparatus by said control means in response to said output signals.

53. A method as defined in claim 52 further comprising the additional steps of employing said ancillary apparatus for adding material generally at said location.

54. A method as defined in claim 52 further comprising the additional steps of employing said ancillary apparatus for removing material generally from said location.

* * * * *

UNITED STATES PATENT AND TRADEMARK OFFICE
CERTIFICATE OF CORRECTION

PATENT NO. : 4,169,543
DATED : October 2, 1979
INVENTOR(S) : David L. Hall

It is certified that error appears in the above—identified patent and that said Letters Patent is hereby corrected as shown below:

In Column 1, line 11, delete "particulr" and insert therefor --particular--.

In Column 5, line 34, delete "spply" and insert therefor --supply--.

In Column 6, line 28, delete "12" and insert therefor --112--.

In Column 6, line 63, delete "supplied" and insert therefor --than--.

In Column 7, line 1, delete "32" and insert therefor --132--.

In Column 7, line 7, delete "ovolts" and insert therefor --volts--.

In Column 7, line 57, delete "62" and insert therefor --162--.

In Column 8, line 19, delete "chanes" and insert therefor --changes--.

In Column 8, line 23, delete "he" and insert therefor --the--.

In Column 8, line 28, delete "16" and insert therefor --116--.

In Column 8, line 47, delete "6" and insert therefor --16--.

UNITED STATES PATENT AND TRADEMARK OFFICE
CERTIFICATE OF CORRECTION

PATENT NO. : 4,169,543

DATED : October 2, 1979

INVENTOR(S) : David L. Hall

It is certified that error appears in the above—identified patent and that said Letters Patent is hereby corrected as shown below:

In Column 10, line 60, after "bin" insert --12'--.
In Column 13, line 3, delete "8" and insert therefor --18--.
In Column 13, line 53, delete "werein" and insert therefor --wherein--.
In Column 16, line 12, delete "38" and insert therefor --39--.

Signed and Sealed this

Twenty-second Day of January 1985

[SEAL]

Attest:

DONALD J. QUIGG

Attesting Officer     Acting Commissioner of Patents and Trademarks